UNITED STATES PATENT OFFICE.

WILLIAM KOEHLER, OF CLEVELAND, OHIO.

PROCESS FOR THE REDUCTION OF ORES.

1,013,498. Specification of Letters Patent. Patented Jan. 2, 1912.

No Drawing. Application filed September 7, 1907. Serial No. 391,833.

*To all whom it may concern:*

Be it known that I, WILLIAM KOEHLER, a citizen of the United States of America, residing at Cleveland, in the county of Cuyahoga and State of Ohio, have invented certain new and useful Improvements in Processes for the Reduction of Ores; and I hereby declare the following to be a full, clear, and exact description of the invention, such as will enable others skilled in the art to which it pertains to make and use the same.

This invention relates to a new process for the treatment of refractory or rebellious ores in order to bring them into such a condition that they may be easily worked according to well known methods.

The object of this invention is to provide a cheap and economical method of securing the complete chloridization of ores.

My invention therefore consists in subjecting the material or ore at a suitable temperature, which will vary according to the ore under treatment, to the action of a halogen acid in the presence of a reducing agent.

In carrying out my process I prefer to subject the material or ore, which is to be treated, to the action of hydrochloric acid in the presence of a reducing agent.

To secure the proper working of my process the ore should be at a suitable temperature during the working, and this temperature will vary according to the nature of the treatment. In some instances the heat of combination will be sufficient alone to bring about the decomposition of the material and in other instances the heat of combination will not be sufficient to carry out the reaction, and it will be necessary therefore to apply external heat.

The process can be carried out in any suitable metallurgical furnace, decomposition receptacle or similar apparatus.

In carrying out my process the material or ore to be treated is first reduced to the proper size and is then placed in the receiving chamber of the furnace or decomposition receptacle as desired. The hydrochloric acid is allowed to enter the chamber together with the reducing agent which is being used and the furnace is maintained at a temperature suitable to effect the decomposition of the ore and the formation of chlorids of the metallic constituents and the liberation of the metalloids either in their elemental condition or as volatile compounds.

I have found that very good results are obtained by the use of hydrogen as a reducing agent and also some of the more common forms of carbon compounds, either in solid, liquid or gaseous form, such as coke, petroleum or water gas and in some instances it is preferable to use a combination of reducing agents, such as hydrogen and a carbon compound together. Instead of admitting the hydrochloric acid directly to the receiving chamber chlorin may be admitted together with a reducing agent, preferably water-gas, in the presence of moisture, either as steam or in any other form, as the chlorin will be converted into hydrochloric acid which will immediately act to decompose the ore.

What I claim is,—

1. The process of treating ores which consists in subjecting them to the action of a halogen acid in the presence of a reducing agent and moisture.

2. The process of treating ores which consists in subjecting them to the action of hydrochloric acid in the presence of a reducing agent and moisture.

3. The process of treating ores which consists in subjecting them to the action of a halogen acid gas in the presence of a reducing agent and moisture.

4. The process of treating ores which consists in subjecting them to the action of gaseous hydrochloric acid in the presence of a reducing agent and moisture.

5. The process of treating ores which consists in subjecting them to the action of a halogen acid in the presence of a reducing agent and moisture at a sufficient temperature to produce the liberation of the metalloids either in their elemental condition or as volatile compounds.

In testimony whereof, I sign the foregoing specification, in the presence of two witnesses.

WILLIAM KOEHLER.

Witnesses:
VICTOR C. LYNCH,
N. L. McDONNELL.